United States Patent [19]
Hill et al.
[11] 4,414,654
[45] Nov. 8, 1983

[54] THINNED ARRAY TRANSDUCER FOR SONAR

[75] Inventors: Eugene E. Hill; Marvin S. Scrimshaw, both of Cornwall, Canada; Edward W. Showalter, North Hollywood, Calif.

[73] Assignee: Canadian Patents and Development Limited, Ottawa, Canada

[21] Appl. No.: 412,249

[22] Filed: Aug. 27, 1982

Related U.S. Application Data

[62] Division of Ser. No. 232,314, Feb. 6, 1981, Pat. No. 4,380,808.

[51] Int. Cl.[3] .............................................. G01S 15/02
[52] U.S. Cl. .................................... 367/103; 367/105; 367/122; 367/126; 367/153
[58] Field of Search ............... 367/105, 122, 126, 153, 367/138, 103

[56] References Cited

U.S. PATENT DOCUMENTS

| | | | |
|---|---|---|---|
| 2,865,016 | 12/1958 | Hudimac et al. | 367/153 |
| 2,925,581 | 2/1960 | Hackley et al. | 367/138 |
| 3,277,432 | 10/1966 | Derouet | 367/138 |
| 3,824,531 | 7/1974 | Walsh | 367/100 X |
| 3,859,622 | 1/1975 | Hutchison et al. | 367/105 X |
| 4,001,763 | 1/1977 | van Heynigen | 367/105 X |
| 4,020,446 | 4/1977 | Iida et al. | 367/138 |

*Primary Examiner*—Richard A. Farley
*Attorney, Agent, or Firm*—Edward Rymek

[57] ABSTRACT

The thinned arrayed transducer for a sonar system includes an array of sonar elements mounted in rows (layers) and columns (staves) on a structure, preferably cylindrical, to form a checkerboard pattern wherein the spacing between adjacent elements in the rows and the columns is equal to or greater than $\lambda_m/2$, where $\lambda_m$ is the wavelength of the signal of frequency $f_o$ transmitted in the medium where the sonar is being used. The transducer structure is made from a layered cloth impregnated with a phenol based material, and includes openings in which the sonar elements are mounted. The sonar elements which are effectively a half wavelength in length consist of a cylindrical ceramic section fixed end-to-end to a cylindrical metal section. The metal section is made of a loading metal, such as brass. The transmit-receive circuitry energizes the elements by row using a modulated signal to form a variable sonar beam. The signals detected by the elements are combined by column or stave to provide a column output signal and the signals from adjacent pairs of columns are combined to provide the output signals for the data processor.

2 Claims, 4 Drawing Figures

THINNED ARRAY TRANSDUCER FOR SONAR

This application is a division of U.S. Pat. application Ser. No. 232,314, filed Feb. 6, 1981 now U.S. Pat. No. 4,380,808.

BACKGROUND OF THE INVENTION

This invention is directed to a 360° electronically scanned sonar and in particular to a sonar having a thinned transducer array.

Conventional volume scanning sonars have transducers in which the array elements are arranged in some type of cylindrical configuration having a matrix of rows (layers) and columns (staves) in which the elements are spaced $\lambda/2$ apart. U.S. Pat. No. 3,409,869 which issued to McCool et al. on Nov. 5, 1968 describes such a transducer. In order to scan horizontally and/or vertically with such a transducer, a control system energizes the elements in the array at predetermined times forming a beam which is scanned either horizontally or vertically. U.S. Pat. No. 3,859,622 which issued to Hutchison et al. on Jan. 7, 1975, describes an electronic scanning switch for beam forming in sonar systems, and U.S. Pat. No. 4,001,763 which issued to Kits van Heyningen on Jan. 4, 1977 describes a further electronically stabilized beam former system for a cylindrical type array in which the transducer is also curved in the vertical direction.

The cost for a large full array sonar transducer can be reduced somewhat by eliminating some of the elements in the array in order to form a thinned array. In linear antenna arrays of the type described in U.S. Pat. No. 3,780,372 which issued to Unz on Dec. 18, 1973 or U.S. Pat. No. 4,071,848 which issued to Leeper on Jan. 31, 1978, the elements are nonuniformily spaced at what is considered to be optimal non-periodic positions in the array.

SUMMARY OF THE INVENTION

It is an object of this invention to provide a sonar apparatus having a uniform thinned array transducer.

These and other objects are achieved in a sonar transducer for operation in a particular medium at a predetermined frequency $f_o$. The transducer includes an array of sonar elements mounted in rows and columns on a structure to form a checkerboard pattern. The spacing between adjacent elements in the rows or in the columns is equal to or greater than $\lambda_m/2$, where $\lambda_m$ is the wavelength of the signal of frequency $f_o$ transmitted in the medium. The spacing between the elements in the rows or in the columns is less than or equal to a distance in the order of $\lambda_m$.

According to another aspect of the invention, the transducer structure is three-dimensional permitting the beam to be transmitted through a planar angle of 360°, and may be cylindrical in shape with the rows of elements located around the circumference of the cylindrical structure and the columns located along the length of the cylindrical structure.

The transducer structure may be made from a layered cloth impregnated with a phenol based material, and include openings in which the sonar elements are mounted. Each sonar element may be cylindrical and consist of a cylindrical ceramic section fixed end-to-end to a cylindrical metal section. The metal section is made of a loading metal, such as brass. The sonar element is effectively half a wavelength in length and in particular each cylindrical section of the sonar element can be approximately $\frac{1}{4}$ wavelength in length where the wavelength is that of the signal of frequency $f_o$ when transmitted through the material of the respective sections.

In accordance with another aspect of this invention, the sonar transducer system includes a transmit-receive circuit for energizing the sonar elements to transmit sonar pulses into the medium and for receiving signals from the sonar elements of sonar signals detected by the sonar elements in the medium. The transmitter provides a modulated signal to each of the rows of sonar elements whereby the elements are energized and transmit a predetermined sonar beam into the medium. The receiver receives individual signals from each of the sonar elements when they are not transmitting, combines the signals from the sonar elements in the columns to provide an output signal for each column, and then combines the output signals from adjacent pairs of columns to provide an output signal for each adjacent pair of columns.

Many other objects and aspects of the invention will be clear from the detailed description of the drawings.

DETAILED DESCRIPTION OF THE DRAWINGS

The transducer array in accordance with the present invention, consists of rows and columns of sonic transmit-receive elements, with the elements positioned in a checkerboard pattern such that half of the columns have elements in the odd numbered rows and the other half of the columns have elements in the even numbered rows. The array may be planar or curved in either dimension. However, for a 360° sonar, the array will preferably be curvilinear so as to form a cylindrical type of transducer 1, as illustrated in FIGS. 1 and 2.

Figure 1:
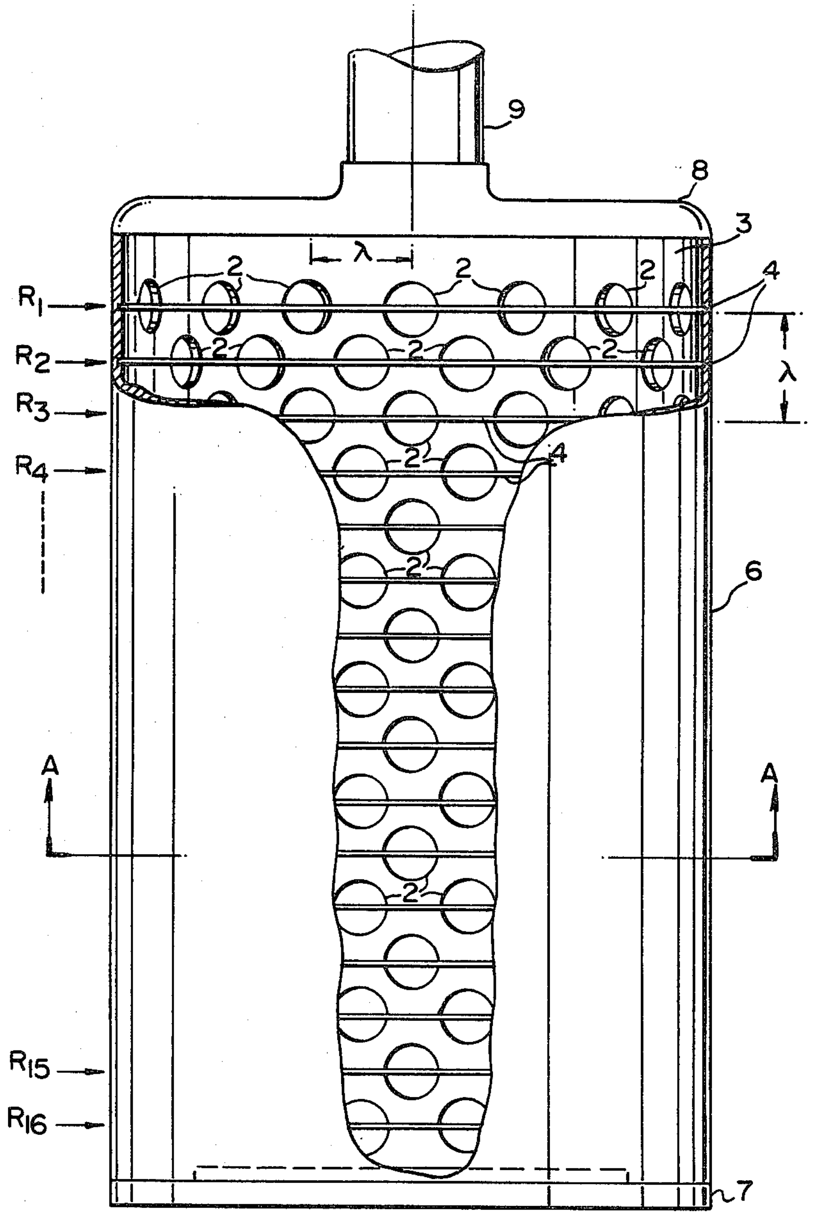
FIG. 1 illustrates a cut-away side view of the transducer.
Figure 2:
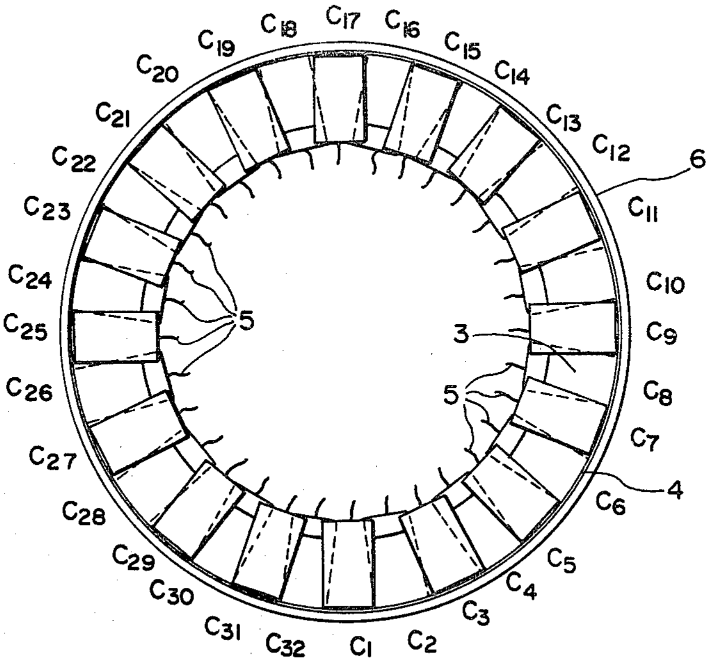
FIG. 2 illustrates the transducer in cross-section.

In FIG. 1, the transducer array 1 shown, has 16 rows or layers, $R_1$–$R_{16}$, of transmit-receive elements 2 distributed in a checkerboard pattern among 32 columns or staves, $C_1$–$C_{32}$. The complete cylindrical transducer 1 includes 256 elements 2 rather than the 512 elements which would be required in a transducer having a matrix of full rows and columns. The element 2 mounting structure 3 in the transducer 1 is preferably of unit construction such as layers of canvas impregnated with a phenolic base material which provides a rigid structure and at the same time minimizes acoustic coupling between the elements 2. The elements 2 are mounted within holes drilled into the wall of the mounting structure 3 such that the elements 2 are flush with the outer surface of the structure 3. The wall of structure 3 is sufficiently thick to provide rigidity but will not normally be thicker than the length of the elements 2.

The positioning of the elements 2 in a checkerboard pattern minimizes the mutual coupling between the elements 2. In addition, the elements 2 in each row and column are spaced up to a distance in the order of $\lambda_m$ between their centers which places the elements between adjacent rows or columns at a distance of up to approximately $0.707\lambda_m$ when the elements are equidistant in the rows and columns. When the distance between the elements in the rows is not equal to the distance between the elements in the columns, it is preferred that the distance between the elements in the columns and the elements in the rows is not greater than a distance in the order of $0.707\lambda_m$. In conventional transducers, the elements in the rows and columns are spaced at a distance of up to $0.5\lambda_m$ between adjacent centers. $\lambda_m$ is the wavelength of the transmitted signal in the particular medium in which the transducer is used, in this case it would normally be sea-water. The present transducer thus allows for extra space in the interior of the transducer 1 so that the interior ends of the elements 2 do not touch and for the necessary wiring and electronics.

The transmitted signal frequency or carrier frequency for fishing sonars is usually between 20 kHz and 200 kHz. In a symmetrical embodiment of the transducer as shown in FIG. 1, the elements 2 in the rows and columns can be spaced at a distance of 6.66 cm, 3.33 cm, and 1.67 cm which are the wavelengths $\lambda_m$ of a sonic signal having a frequency of 22.5 kHz, 45 kHz and 90 kHz, respectively, in sea-water where the average velocity of sound is taken to be 1500 m/s.

Figure 3:
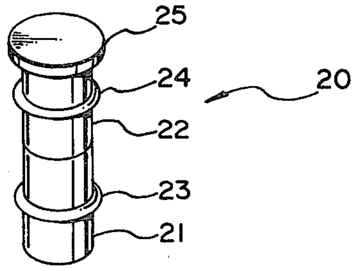
FIG. 3 illustrates one of the sonar elements.

Conventional sonic elements may be used in the transducer 1, however, a transmit-receive element 20, which is particularly applicable, is illustrated in FIG. 3. Element 20 consists of two cylindrical sections 21 and 22 fixed together end-to-end, the first section 21 being made of a ceramic material and the second section 22 being made of a heavy loading metal such as brass. The total effective length of the element 20 is approximately $\lambda_e/2$, where $\lambda_e$ is the sum of the effective wavelengths $\lambda_c$ and $\lambda_d$ of the sonar operating signal as it is transmitted through in the ceramic and metal sections, respectively. For practical purposes, the sections 21, 22 in element 20 are made to be $\lambda_c/4$ and $\lambda_d/4$, respectively. Each element 20 also includes a pair of "O" rings 23, 24, for mounting it within a cylindrical opening in the transducer wall while at the same time allowing it to vibrate freely. The metal section 22 may be expanded at its free end to form an enlarged face 25. Element 20 is mounted such that face 25 is on the outside of the transducer 1 towards the conducting medium. The diameter of the cylindrical sections, and particularly face 25, is selected to achieve as broad a transmitted beam as possible, i.e. in the order of 120°, and at the same time to provide an element with satisfactory output power transmission. This element 20 would therefore preferably have a maximum diameter in the order of $\lambda_m/2$.

The elements 2 in the transducer 1 may be energized individually, however in the embodiment shown in FIG. 1, the transducer 1 further includes conductive rings 4 mounted around the outer wall of the transducer 1. Each ring 4 electrically connects together all of the elements 2 in a row or layer, $R_1$, $R_2$, $R_3$ . . . This ring 4 is then connected to the transmitter pulsing circuit. Thus each element 2 in a row is pulsed simultaneously, and each row may be either pulsed or phased differently to form the desired transmitted sonar beam. The received sonar signal, on the other hand, is detected by each element 2 and the electrical signal taken off of a lead 5 located at the ceramic end of the element 2 or on the inside of the transducer 1.

A layer 6 of suitable booting material such as polyurethane may be used to cover the outer wall of the transducer 1 with the elements 2 and the rings 4. Both ends of the transducer 1 would be sealed so as to protect the interior from the sea-water. One end may be sealed by a cap 7 fixed into the end of structure 3. A flange 8 with a pipe 9 may be bolted to the other end of the structure 3 by which the transducer 1 is supported and through which the transducer leads 5 are passed.

Figure 4:
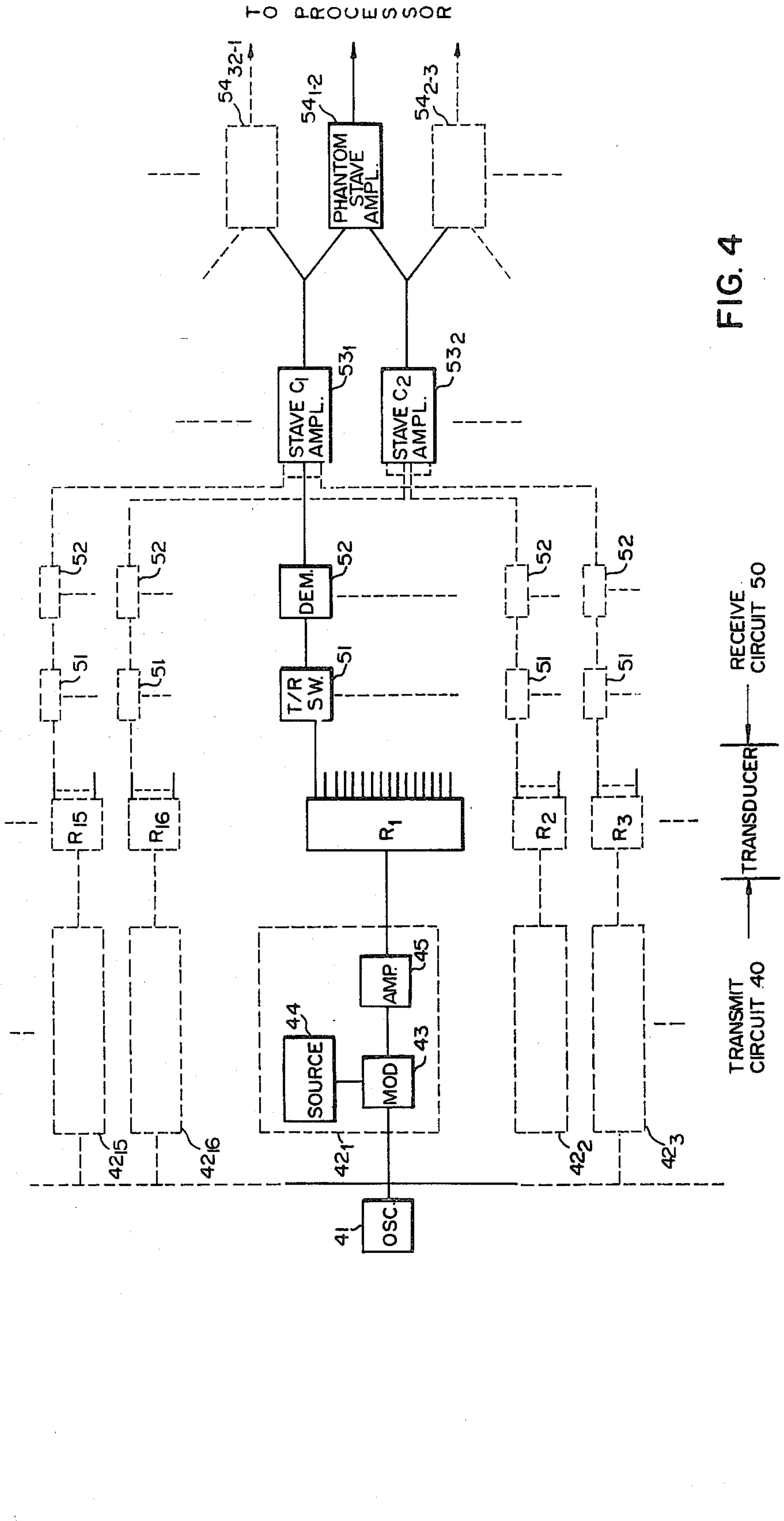
FIG. 4 is a schematic of the transmit/receive circuits for the sonar.

The transmission and reception of sonar signals is described in detail with respect to FIG. 4 which is a schematic of the transmit/receive circuit. The transmit circuitry 40 includes an oscillator 41 which provides the carrier signal for the transmitter. The oscillator 41 frequency $f_o$ is set to the desired frequency for the system which will be either 22.5 KHz, 45 kHz, or 90 kHz for a standard system. The transmit circuitry 40 further includes identical element energizing circuits $\mathbf{42}_1$, $\mathbf{42}_2$, $\mathbf{42}_3$, . . . $\mathbf{42}_{16}$ for each of the rings $R_1$, $R_2$, $R_3$, . . . $R_{16}$ in the transducer 1. In the present embodiment, each of the 16 rings includes 16 sonar elements 2. The energizing circuit includes a modulator 43 for modulating the input carrier signal by a predetermined pulse signal such as a 3 kHz signal from a controllable source 44. The source 44 controls the modulator 43 such that its output can be varied relative to any of the other modulators in the transmit circuit 40 both in time and in amplitude. Thus when the transmit circuit 40 energizes all of the elements 2 in all of the rings $R_1$, $R_2$, $R_3$, . . . $R_{16}$, a 360° controllable beam is formed which is the result of the beams generated by the elements 2 in each of the rings $R_1$, $R_2$, $R_3$, . . . $R_{16}$ that are adjusted in phase and amplitude. Though the sonar beam of approximately 12° in width will normally only be controlled to scan vertically up to an angle of 45° to the horizon, it may also be controllable to vary in shape, width or strength.

The energizing circuitry $\mathbf{42}_1$, $\mathbf{42}_2$, $\mathbf{42}_3$, . . . further includes an amplifier 45 for amplifying the modulated signal before is applied to the rings $R_1$, $R_2$, $R_3$, . . . $R_{16}$.

The receive circuitry 50 includes a transmit/receive switch for each of the sonar elements 2 in the transducer. The T/R switch 51 for the elements 2 in any particular ring $R_1$, $R_2$, $R_3$, . . . $R_{16}$, is controlled by the source 44 for that ring so that the switch 51 is open only when the sonar element 2 is energized to transmit a sonar pulse, and will be closed at all other times. The receive circuit 50 further includes a demodulator 52 at the output each switch 51. The demodulator 52 heterodynes the recieved signal under the control of the oscillator 41 signal which itself is phase controlled to steer the received beam.

The outputs from the demodulators 52 are fed to stave amplifiers $\mathbf{53}_1$, $\mathbf{53}_2$, . . . $\mathbf{53}_{32}$ in a predetermined manner. As shown in FIG. 2, the embodiment of the transducer 1 includes 32 columns or staves, each having 8 sonar elements 2. Thus the output from the eight elements 2 in stave $C_1$ will be combined in stave amplifier $\mathbf{53}_1$; and so on for all 32 staves. A further set of 32 signal combining amplifiers $\mathbf{54}_{1\text{-}2}$, $\mathbf{54}_{2\text{-}3}$, $\mathbf{54}_{3\text{-}4}$, . . . $\mathbf{54}_{32\text{-}1}$ are each fed the resulting outputs from adjacent staves to provide combined output signal. This output signal represents a phantom stave signal formed by combining the signals of the elements 2 in adjacent staves where the elements 2 are off-set from one another. These phantom stave signals are effectively similar to the stave signals from a conventional matrix transducer and contain essentially the same information. The 32 phantom stave signals are then fed to a processing circuit 55 to extract the desired information from the signals for either storage and/or display.

Many modifications in the above described embodiments of invention can be carried out without departing from the scope there and therefore the scope of the present invention is intended to be limited only by the appended claims.

We claim:

1. A sonar transducer system for operation in a particular medium at a predetermined frequency $f_o$, comprising:

an array of sonar elements mounted in rows and columns on a structure to form a checkerboard pattern wherein the spacing between adjacent elements in the rows or columns is equal to or greater than $\lambda_m/2$, where $\lambda_m$ is the wavelength of the signal of frequency $f_o$ transmitted in the medium;

transmit means for separately providing a modulated signal to each of the rows of sonar elements whereby the elements are energized and transmit a predetermined sonar beam into the medium; and receive means for receiving signals from the sonar elements when they are not transmitting, said receive means having first means for combining the signals from the sonar elements in the columns to provide an output signal for each column; and second means for combining the output signals from every adjacent pair of columns to provide an output for each pair of columns.

2. A sonar transducer system as claimed in claim 1 wherein the spacing between the elements in the rows or columns is less than or equal to a distance in the order of $\lambda_m$.

* * * * *